United States Patent
Mostowy-Gallagher et al.

(10) Patent No.: US 10,544,317 B2
(45) Date of Patent: Jan. 28, 2020

(54) THERMOFORMABLE CONDUCTIVE INKS AND COATINGS AND A PROCESS FOR FABRICATION OF A THERMOFORMED DEVICE

(71) Applicant: SUN CHEMICAL CORPORATION, Parsippany, NJ (US)

(72) Inventors: Maura Mostowy-Gallagher, Succasunna, NJ (US); John Watson, Bridgewater, NJ (US)

(73) Assignee: Sun Chemical Corporation, Parsippany, NJ (US)

( * ) Notice: Subject to any disclaimer, the term of this patent is extended or adjusted under 35 U.S.C. 154(b) by 0 days.

(21) Appl. No.: 15/517,078

(22) PCT Filed: Sep. 29, 2015

(86) PCT No.: PCT/US2015/052808
§ 371 (c)(1),
(2) Date: Apr. 5, 2017

(87) PCT Pub. No.: WO2016/060838
PCT Pub. Date: Apr. 21, 2016

(65) Prior Publication Data
US 2017/0298242 A1 Oct. 19, 2017

Related U.S. Application Data

(60) Provisional application No. 62/063,643, filed on Oct. 14, 2014.

(51) Int. Cl.
*H01B 1/22* (2006.01)
*C09D 11/101* (2014.01)
(Continued)

(52) U.S. Cl.
CPC ............ *C09D 11/101* (2013.01); *C09D 11/40* (2013.01); *C09D 11/52* (2013.01); *H01B 1/22* (2013.01)

(58) Field of Classification Search
CPC ....... C09D 11/101; C09D 11/40; C09D 11/52; H01B 1/20; H01B 1/22
(Continued)

(56) References Cited

U.S. PATENT DOCUMENTS

| 5,855,706 A | 1/1999 | Grewell |
| 5,885,706 A * | 3/1999 | Bergmann ............... C09D 5/24 252/500 |

(Continued)

FOREIGN PATENT DOCUMENTS

| CN | 101313253 A | 11/2008 |
| CN | 103450744 A | 12/2013 |

(Continued)

OTHER PUBLICATIONS

Chinese Office Action issued in counterpart Chinese Application No. 201580056195.4; dated Aug. 20, 2018 with its English language translation.

(Continued)

*Primary Examiner* — Mark Kopec
*Assistant Examiner* — Jaison P Thomas
(74) *Attorney, Agent, or Firm* — Charles C. Achkar; Ostrolenk Faber LLP

(57) ABSTRACT

Thermoformable inks and coatings, such as conductive inks and coatings, are provided. These inks and coatings can be used in printed electronic thermoformed devices. These conductive inks and coatings are suitable to be used as one or more printed layers of a printed electronic device printed with multiple layers of inks and/or coatings (printed stacked array). Methods of fabricating printed electronic devices (Continued)

using the thermoformable inks and coatings are also provided.

40 Claims, 4 Drawing Sheets

(51) Int. Cl.
*C09D 11/52* (2014.01)
*C09D 11/40* (2014.01)

(58) Field of Classification Search
USPC .......................................... 252/500
See application file for complete search history.

(56) References Cited

U.S. PATENT DOCUMENTS

| | | | |
|---|---|---|---|
| 6,069,214 | A | 5/2000 | McCormick et al. |
| 7,486,280 | B2 | 2/2009 | Iandoli et al. |
| 8,477,506 | B2 | 7/2013 | Moncrieff |
| 8,514,454 | B2 | 8/2013 | Fujimoto et al. |
| 8,940,813 | B2 | 1/2015 | Araki et al. |
| 2005/0002168 | A1 | 1/2005 | Narhi |
| 2009/0269691 | A1 | 10/2009 | Yamato et al. |
| 2010/0119789 | A1 | 5/2010 | Grande |
| 2011/0095090 | A1 | 4/2011 | Tracy et al. |
| 2012/0142832 | A1* | 6/2012 | Varma .................. C09D 5/24 524/145 |
| 2012/0314348 | A1 | 12/2012 | Moncrieff |
| 2014/0037941 | A1 | 2/2014 | Dorfman et al. |
| 2014/0050504 | A1 | 2/2014 | Fukao et al. |
| 2014/0288262 | A1 | 9/2014 | Yamato et al. |
| 2014/0367619 | A1* | 12/2014 | Summers ................ H01B 1/22 252/512 |

FOREIGN PATENT DOCUMENTS

| | | |
|---|---|---|
| CN | 103620502 A | 3/2014 |
| JP | 62-177885 | 4/1987 |
| JP | 2013-028115 A | 2/2013 |
| WO | WO 2011/072717 A1 | 6/2011 |

OTHER PUBLICATIONS

International Search Report issued in International Application No. PCT/US2015/052808, dated Dec. 15, 2015.
Written Opinion of the International Searching Authority issued in International Application No. PCT/US2015/052808, dated Dec. 15, 2015.
International Preliminary Report on Patentability issued in PCT/US2015/052808 dated Apr. 18, 2017.
Supplementary Search Report issued in European Counterpart Application 15 850 155.1 dated Feb. 12, 2018.
Office Action issued in Chinese Counterpart Application 201580056195.4 dated Dec. 24, 2018.
Japanese Office Action issued in counterpart Japanese Application No. 2017-519849; dated Jul. 29, 2019 with its English language translation.

* cited by examiner

THERMOFORMABLE CONDUCTIVE INKS AND COATINGS AND A PROCESS FOR FABRICATION OF A THERMOFORMED DEVICE

CROSS REFERENCE TO RELATED APPLICATIONS

The present application is a § 371 National Phase application based on PCT/US2015/052808 filed Sep. 29, 2015, which claims the benefit of U.S. Provisional Application No. 62/063,643, filed Oct. 14, 2014, the subject matter of each of which is incorporated by reference in their entirety.

FIELD OF THE INVENTION

The present invention is related to thermoformable inks and coatings that are suitable for printed and thermoformed electronic devices. The thermoforming may be of any suitable process, such as vacuum thermoforming or in-molding (e.g. in-mold-decorative devices (IMD) or in-mold-electronic devices (IME)). Printed electronic thermoformed devices can be used in applications such as, for example, automotive consoles, appliance interactive panels, capacitive and resistive switch devices, shielding devices, radio frequency identification devices, lighted assemblies, and many other applications. Thermoformable conductive inks and coatings are provided that can be used in printed electronic thermoformed devices. These conductive inks and coatings are suitable to be used as one or more printed layers of a printed electronic device printed with multiple layers of inks or coatings (printed stacked array). The present invention is also related to methods of fabricating electronic printed thermoformed devices.

BACKGROUND

The process of thermoforming a decorated sheet to produce a three-dimensional decorated article is well-known in the industry, and inks have been formulated for this process. For example, high elongation inks can be formulated to have sufficient adhesion to the substrate, such as polycarbonate, polyesters, acrylics, and others, and flexibility so that they do not crack during the thermoforming process. The advantages of this process include allowing reverse-printing on a second surface of a transparent plastic substrate so that the visible surface in contact with the environment has resistance to scratch, abrasion, and weathering. Printable conductive inks can further be printed on this surface and back filled with molten plastic to create encapsulated electronic devices. Applications for this process include automotive interior parts such as instrument panels, appliance control panels, moldings, and display moldings. Methods for producing decorated and functionalized thermoformed and in-molded electronic devices have also been described, such as the formation of in-molded capacitive switches and encapsulated displays. In actual practice however, the formation of complex electronic devices which depends on the successful layering of printed graphics, electronic traces, and insulating layers, has been difficult to achieve. What is needed is a set of compatible printable layers, including graphic inks, conductive inks, and insulating or dielectric coatings, which are at once compatible, adhesive, and durable when used to form a complex functional electronic device.

Thermoformable inks have been described. See for example, US 2010/0215918; GB 2359556; and US 2014/0037941. Such thermoformable inks include graphic inks and conductive inks.

Thermorformable electronic devices, and methods for producing these devices have also been described. See, for example, U.S. Pat. No. 8,514,454; US 2012/0314348; U.S. Pat. No. 8,477,506; WO 2011/076717; U.S. Pat. No. 7,486,280; and US 2011/0095090. Such devices include in-molded capacitive switches and touch control panels, control panel assemblies, thermoformed parts for use in devices, and in-molded RFID devices.

The prior art describes various decorative inks for thermoforming and in-molding, and also cases of thermoformable conductive inks. However, the ability to create a complex thermoformed in-molded device comprised of multiple layers of graphic inks, conductive circuitry, and insulating layers, as well as various electronic elements such as displays, lighting, sensors, and the like, has proven difficult to achieve in practice. The formulated conductive inks of this invention can be used to create a high quality IMD or IME part that contains a printed stack of mutually compatible layers that include graphic layers, conductive layers, and dielectric layers. In addition, the layers have similar elongation properties so that cracking and delaminating during the thermoforming process does not occur.

The commercial advantages of an in-mold electronic device with capacitive switch elements rather than mechanical wired devices have been recognized. However, the prior art has not provided a comprehensive system of printable fluids that can work together in a printed stacked array to allow the formation of such complex devices without failures due to poor compatibility of functional layers and other material requirements of thermoforming and in-molding.

A problem to be solved remains to create a system of decorative and functional inks and coatings that can be used together in a layered design to create a decorative and functional part. A conductive layer printed over a decorative layer for example, can have increased resistance because of interference by the underlying decorative layer. Another problem is that a thermoformed system of layered dielectric over a printed conductive circuit undergoes severe cracking due to the incompatibility of the dielectric layer with the printed electronic circuit or due to the inability of the printed circuit to deform without cracking during the thermoforming process. Yet another problem to be solved is maintaining low resistance in a printed circuit which contains a binder system that allows deformation without cracking. In many cases the binder system acts as an insulator for the conductive dispersed phase to such a degree that although the circuit can be formed without cracking, it does not have sufficient conductivity to function reliably in a printed and thermoformed device. A successful solution requires a printable fluid with flexibility during thermoforming, which can maintain conductivity after thermoforming, is compatible with adjacent printed layers, and has excellent intercoat adhesion.

SUMMARY OF THE INVENTION

The present invention provides thermoformable conductive inks and coatings that are suitable to be used in the fabrication of printed, thermoformed electronic devices. The thermoformable conductive inks and coatings are suitable to be used in a printed stacked array of an electronic device, in combination with underlying graphic ink or coating layers, and overlying dielectric inks or coatings.

In a particular aspect, the present invention provides an ink or coating composition comprising:
  a) a polymer resin selected from the group consisting of: a vinyl resin; a blend of a vinyl resin with a polyurethane resin; a blend of a vinyl resin, polyurethane resin and energy curable resin composition comprising an acrylated polymer or oligomer having an aromatic or aliphatic polycarbonate backbone; a blend of a vinyl resin with a polyester resin; a polyester resin; a co-polyester resin; an energy curable resin composition comprising an acrylated polymer or oligomer having an aromatic or aliphatic polycarbonate backbone; a blend of a polyester resin with an energy curable resin composition comprising an acrylated polymer or oligomer having an aromatic or aliphatic polycarbonate backbone; a blend of a vinyl resin, a polyester resin, and energy curable resin composition comprising an acrylated polymer or oligomer having an aromatic or aliphatic polycarbonate backbone; a cationic resin which contains aliphatic monomers; and a blend of a cationic resin with a solvent-based resin; and b) a conductive metal powder;

wherein the ink or coating is a thermoformable conductive ink or coating.

In one aspect, the present invention provides a thermoformable printed electronic device comprising a stacked print array, wherein at least one of the printed layers of the stacked print array is a thermoformable conductive ink or coating of the invention.

In a certain aspect, the present invention provides a set of compatible inks or coatings for use in a printed stacked array comprising one or more each of a graphic ink or coating, a conductive ink or coating of the invention, and a dielectric coating.

In another aspect, the present invention provides a printed electronic device formed using the sets of compatible inks or coatings.

The formulated conductive inks of this invention can be used to create a high quality IMD/IME part that contains a printed stack of mutually compatible layers that include graphic layers, conductive layers, and dielectric layers. In addition, the layers have similar elongation properties so that cracking and delaminating during the thermoforming process does not occur.

BRIEF DESCRIPTION OF THE DRAWINGS

In FIG. 1 the next layer on top of the graphic layer is a printed circuit or conductive traces (5) in one or more layers.

FIG. 6A is a vinyl-polyurethane based ink print at 20% elongation after thermoforming, showing minimal micro-cracks. FIG. 6B is a print of a hybrid ink based on a mixture of a vinyl resin and a polyurethane resin, at 22% elongation after thermoforming, showing micro-cracks. FIG. 6C is polyester based ink print (Example 10) at 23% elongation after thermoforming, with no cracks. FIG. 6D is a polyester based ink print at 50% elongation after thermoforming, with no cracks.

FIG. 7A is a vinyl based ink print thermoformed to 22% elongation, showing cracks. FIG. 7B is a thermoformed print of a hybrid ink based on a mixture of a vinyl resin and a polyurethane resin, with 1% UV curable resin (w/w). The print thermoformed to 23% elongation, and shows reduced cracking compared to the vinyl alone. FIG. 7C is a thermoformed print of a hybrid ink based on vinyl and polyurethane, with 10% UV curable resin (w/w). The print is thermoformed to 32% elongation with no cracking.

DETAILED DESCRIPTION OF THE INVENTION

It is to be understood that the foregoing general description, and the following detailed description are exemplary and explanatory only, and are not restrictive of any subject matter claimed.

Unless otherwise defined, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety for any purpose.

Methods and formulations are disclosed for producing decorated functional thermoformed electronic devices, in which the specific formulations of the functional layers are designed to withstand in actual practice the high demands of the process without damage or loss of conductivity and device function. Also described is a method of fabricating a thermoformed part comprising a thermoformable substrate printed with one or more layers of ink or coating formulations to create a decorative surface which may also have printed electronic layers to make a functional electronic device. In this process, each ink or coating layer is formulated in order to be non-resoluble in the fluid phase of a preceding or subsequent ink or coating layer, yet mutually compatible in a printed stack array, and to be capable of elongation and functionality. The inks and coatings withstand the processes of layering, thermoforming, and injection molding without resolubilizing of adjacent layers, cracking, delamination, washout, or loss of conductivity or other functionality, thus preserving the ultimate performance of the finished device. A substrate is printed with multiple subsequent applications of decorative, electronic, and insulating patterned layers which are cured by some process, either energy curing, thermal heating, or a combination of both to produce a functional part, such as a capacitive switch or an encapsulated conductive circuit. The layer-printed stack may then be thermoformed into a three-dimensional shape, fixed into a mold, and then injection molded to form a rigid functional part, such as a capacitive switch or electronic console or other device. These layers are compositionally formulated to be mutually compatible with one another, having good adhesion and elongation properties, as well as very low sheet resistivity, and which may comprise layers of printed decorative, electronic, and dielectric layers, where the layers do not interfere with one another during application, layered printing, curing, and forming of the functional decorated device.

Figure 1:
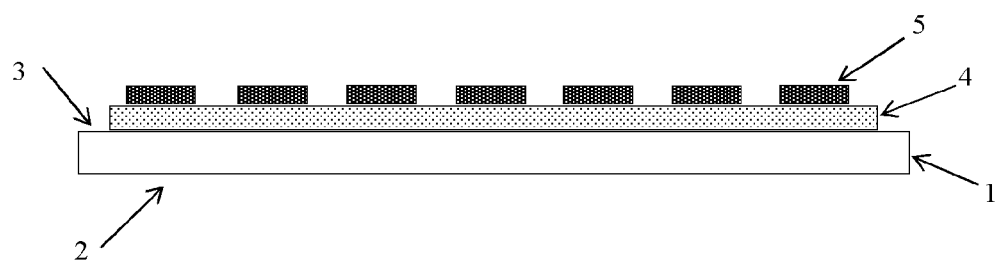
FIG. 1 shows a flexible substrate (1) having an outward-facing first surface (2) and an inner second surface (3) on which is reverse printed a layer of graphic inks (4) which are viewed from the side of the first surface. The first surface is intended as the user interface side in a printed thermoformed and in-molded device.
Figure 2:
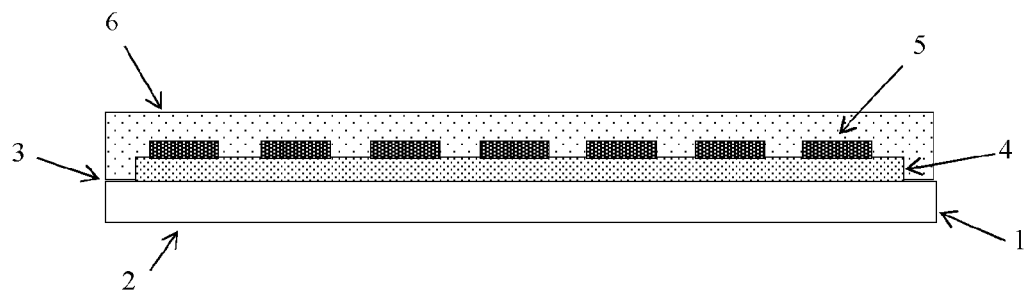
FIG. 2 shows the addition of a layer of one or more layers of insulating coating or dielectric layer (6) on top of the graphic and conductive layers.
Figure 3:
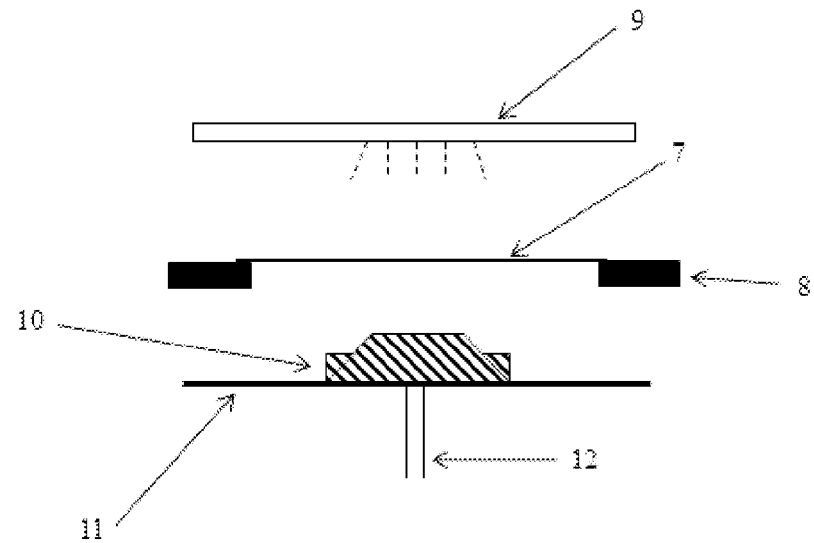
In FIG. 3, the printed flexible film (7) is mounted into a fixing frame bracket (8) and heat is applied so that the printed film reaches its softening temperature. A forming tool (10) is set on a platform (11) in the thermoforming machine, which also has a vacuum pump attachment (12).
Figure 4:
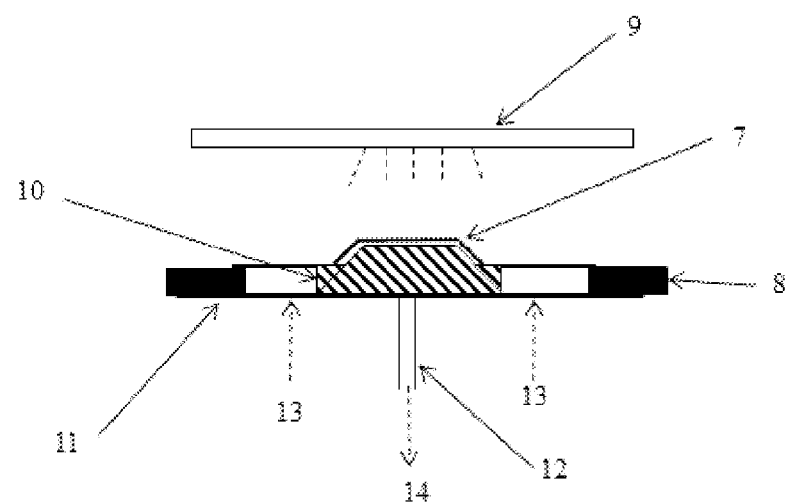
FIG. 4 shows the thermoforming process in which the lower platform (11), which supports the forming tool (10), is raised to the level of the heated printed film (7) at the same time as a vacuum is applied, causing the printed film to be shaped into a three dimensional form conforming to the shape of the forming tool. Dashed up arrows (13) show that the platform is moved up, and dashed down arrow (14) shows that a vacuum is applied at the same time that the platform is raised.

FIGS. 3 and 4 show the process step of thermoforming a stack-printed flexible film as is performed in an industrial setting, or in a laboratory test setting, as for example using the Formech 300 XQ vacuum thermoformer. This printed film will have any or all of the printed layers shown in FIG. 2, such as the graphic, conductive, and dielectric inks, although the individual layers are not explicit in FIGS. 3 and 4. The printed flexible film may be in the thickness range of about 1 mil to 30 mils, or more, and may be polycarbonate, acrylic, polyester, or other type of film substrate. As shown in FIG. 3, the printed flexible film is mounted into a fixing frame bracket and heat is applied so that the printed film reaches its softening temperature. A forming tool is set on a platform in the thermoforming machine, which is also capable of attaching to a vacuum pump. FIG. 4 shows the thermoforming process in which the lower platform, which supports the forming tool, is raised to the level of the heated printed film at the same time as a vacuum is applied, causing the printed film to be shaped into a three dimensional form conforming to the shape of the forming tool.

Definitions

In this application, the use of the singular includes the plural unless specifically stated otherwise. As used herein, the singular forms "a," "an" and "the" are intended to include plural forms as well, unless the context clearly indicates otherwise.

In this application, the use of "or" means "and/or" unless stated otherwise.

As used herein, the terms "comprises" and/or "comprising" specify the presence of the stated features, integers, steps, operations, elements, and/or components, but do not preclude the presence or addition of one or more other features, integers, steps, operations, elements, components, and/or groups thereof. Furthermore, to the extent that the terms "includes," "having," "has," "with," "composed," "comprised" or variants thereof are used in either the detailed description or the claims, such terms are intended to be inclusive in a manner similar to the term "comprising."

As used herein, ranges and amounts can be expressed as "about" a particular value or range. "About" is intended to also include the exact amount. Hence "about 5 percent" means "about 5 percent" and also "5 percent." "About" means within typical experimental error for the application or purpose intended.

As used herein, the terms "inks," "coatings," "inks and coatings" and "fluids" are used interchangeably.

As used herein, the term "vinyl-polyurethane" means a mixture of a vinyl resin with a polyurethane resin.

As used herein, the term "polyester-polyurethane" means a mixture of a polyester resin with a polyurethane resin.

As used herein, the term "vinyl-polyester" means a mixture of a vinyl resin with a polyester resin.

As used herein, "thermoform" and "thermoforming" means to shape by heat and pressure, especially a thermoplastic material. For example, reference is made to a manufacturing process where a plastic sheet or film (substrate) is heated to a pliable forming temperature (such as the melting or softening temperature of the substrate); and formed to a specific shape in a mold. The substrate is then allowed to cool, producing a usable product.

As used herein, "thermoformable" refers to a property of a product, such as an ink or coating, whereby the product can be heated and shaped (elongated), with little or no compromise of its structural integrity or functionality.

As used herein, "thermoformability" is an assessment of the degree to which a product, such as a printed ink, can be thermoformed, with little or no compromise of its structural integrity or functionality.

As used herein, "injection molding," "in-molding," "in-mold decoration," "in-molding decoration" and "IMD" refer to a process whereby a printed and (thermo)formed substrate/film is placed into the cavity of a mold; melted resin or plastic is then injected into the mold to create a fully encapsulated rigid part. The rigid parts so produced are referred to as In-Mold-Decorative (IMD) devices, or, for devices with electrical conductivity, they may also be referred to as In-Mold-Electronic (IME) devices. When the term "IMD" is used it encompasses "IME" as well, unless specifically stated otherwise.

As used herein, "conductivity" refers to electrical conductivity, which is a property that measures a material's ability to conduct electric current.

As used herein, "high conductivity" means that the printed conductive traces have a minimal resistance as measured in ohms. What is considered to be a minimal resistance depends on a number of factors, including the circuit design, film thickness, and the requirements of the application. For example, for a 600 squares printed resistor circuit design, with a film thickness of about 8 to 20 microns, used in the printed electronics industry, the desired maximum resistance is about 15 to about 270 ohms.

As used herein, "resistivity" means electrical resistivity, which is a property that quantifies how strongly a given material opposes the flow of electric current.

As used herein, "bulk resistivity" is an intrinsic property of materials which describes its inherent resistance to the flow of electrons, regardless of shape or size, and is expressed in units of ohm-cm.

As used herein, "sheet resistivity" or "sheet resistance" means the resistance of a thin film, which depends on the thickness of the film, and is commonly expressed in units of ohms per square, or milliohms per square.

As used herein, "percent elongation" or "% elongation" is a measure that refers to the amount that a material is elongated or stretched, relative to the initial length of the material, during thermoforming.

As used herein, "high elongation" means a percent elongation approximately equal to or greater than 20%.

As used herein, "washout resistance" or "resistance to washout" means resistance to damage of printed layers during the process of injection molding.

As used herein, "resistance to cracking" means the resistance to cracking of a printed trace when subjected to thermoforming. A print that is resistant to cracking shows no or minimal cracking of the printed ink when thermoformed to about 20% or greater elongation.

As used herein, the terms "print stack array" or "printed stack array" refer to multiple printed layers of inks or coatings on a substrate. Each successive layer is printed on top of the previous layer or layers.

As used herein, the term "resin" refers to the organic polymeric portion of the ink. The "binder" of an ink refers to the totality of resins.

Throughout this disclosure, all parts and percentages are by weight (wt % or mass % based on the total weight) and all temperatures are in ° C. unless otherwise indicated.

Thermoformable Inks and Coatings

The formulated conductive inks of the invention are designed such that they can be used to create fully functional complex electronic devices within the process of in-mold (IMD) electronics, also known as film insert molding. In this process, the printing of conductive and dielectric layers permits the realization of capacitive switches and other electronic elements combined with indicia and graphic decoration in a single part, as part of a system of in-mold decorative design, or IMD. The successful formation of a layered printed, thermoformed, and in-molded device has been very difficult to achieve in practice to date for reasons relating to the material demands of the printable fluids used to create the thermoformed and in-molded device. The difficulty is partly due to the inability of a printed conductive circuit to maintain conductivity after thermoforming, which may involve the application of a strain applied to the circuit, and the need to achieve elongation of the circuit. Another difficulty relates to poor compatibility among the dried ink layers, which leads to cracking after elongation, delamination, and loss of conductivity. Other failures derive from washout during the in-molding process from poor heat resistance, and other loss of device performance, because the conductive, graphic, and dielectric fluids have not been sufficiently engineered to withstand the rigors of thermoforming and in-molding of a stack of printed layers. For example, a mismatch in elongation properties or shrinkage of the functional printed layers of graphic and insulating layers can cause cracking and delamination. The interference of adjacent layers with the conductive printed circuitry can lead to a sharp increase in resistivity of the printed circuitry. The process of injection molding with molten plastic can cause washout of the printed layers, where the print melts and flows off of the substrate under heat and pressure of molten plastic.

In the present invention, these problems are solved by formulating the ink layers in order to be fully compatible in the dried state, yet incompatible in the fluid printing state. The formulation of the conductive printable layers allows high elongation, inter-layer adhesion, and the ability to withstand high temperatures during back-filling with molten plastic in the in-molding step. The stacked and dried ink film layers do not resolubilize with subsequent printed layers, preserving the low electrical resistance of the conductive layer. Further, each wet ink must be designed so that it both wets and spreads on the dried ink layer beneath it without resolubilization, then, after drying and optionally curing, it must permit the next wet ink to be printable upon it, again with no resolubilization. The conductive inks are formulated to allow for thermoforming and the imposing of a deformation such as an engineering strain or elongation without cracking and breakage of the continuous printed circuit.

The system of printable fluids of this invention include conductive inks that can be used with graphic inks that preferably comprise an acrylated polyurethane polymer or oligomer containing a polycarbonate backbone (such as those described in Sun Chemical patent U.S. Pat. No. 7,763,670), and a dielectric coating based on the chemistry of the graphic inks in a system of compatible highly functional layers that allow the realization of in-mold device structures. The conductive inks of this invention meet the material engineering requirements imposed by the stacking of functional layers which have limited the realization of these devices in actual practice to date. The present invention allows a flexible process in which graphic, conductive, and insulating coatings can be stack-printed in multiple variations of layering and circuit design, because the conductive inks are formulated for interlayer compatibility, adhesion, resistance to elongation damage during thermoforming, and resistance to high temperatures during in-molding. The conductive inks are designed to eliminate shorting or increases in resistivity due to interference from adjacent layers. The conductive inks are furthermore designed using resins that maximize conductivity and allow lower levels of conductive powder to achieve equivalent conductivity of inks using higher loading of conductive powders. The conductive inks of this invention may be easily balanced to optimize elongation and conductivity properties, making them adaptable for specific device design, within a material platform that can in practice accommodate the material demands of thermoforming and in-molding.

The present invention provides a specific way of formulating a system of functional printable fluids which can undergo thermoforming and possible elongation and/or shape deformation and still maintain conductivity of printed electronic circuitry, and/or withstand the process of injection molding. The present invention provides sets of compatible inks or coatings wherein adjacent printed layers do not interact so as to cause resolubilization of preceding or subsequent layers, delamination, or a decrease in the conductivity and/or increase in the bulk resistivity or sheet resistance of the printed conductive layer. Thus, the present invention provides the ability to layer the conductive printed circuit with graphic and other functional printed layers which have sufficient compatibility and the method of layering these non-interfering fluids so that the high conductivity properties of a solvent-based conductive ink can be coupled with the advantages of non-solvent based graphic and dielectric functional layers. The mechanisms by which the layers do not interact include the following: i) the layers are covalently bonded by radiation curing; or ii) the resins in one layer are not soluble in the solvents of the underlying or overlying layer; or iii) the resins in one layer are water soluble.

The successful application of this layered structure allows the fabrication of a layered device which can be thermoformed into a three-dimensional structure and made into a functional, lightweight, and streamlined part. The set of printable fluids, including graphic inks, conductive inks, and insulating coatings, are formulated in order to withstand the thermoforming process and injection molding process while simultaneously preserving the functionality of the layers, and the compatibility of layers designed for different functions. Such design is the object of a new generation of printed electronic devices used in automotive applications, appliances, and other devices that contain capacitive switches, sensors, lighting, indicators, or other functions incorporated into a single device or control panel having no mechanical parts, but for which there has been a lack of printable conductive inks that fulfill the material requirements of creating in practice such devices.

Provided herein are methods for forming decorated functional in-mold devices with high quality printed circuitry in which the fluids used to print the device are formulated in order to be capable of being thermoformed and backfilled by injection molding without a degradation of properties during the forming and backfilling processes, and without a loss of device performance. The fluids include a conductive ink formulated to undergo thermoforming elongation and high temperature exposure during the in-molding step without loss in conductivity, and that adjacent printed base layers or top layers will not resolubilize or be resolubilized. The fluids also include an insulating coating that is capable of high elongation and heat resistance, and also will not resolubilize or be resolubilized by the printed conductive layer. The fluids are in addition formulated so that they are similar in terms of flexibility during elongation and shrinkage during cooling, and such that they have good adhesion to one another to prevent delamination.

A further object of this invention is to design a series of printable fluids or inks which during printing wets and flows such that the first ink down dries, and, optionally, cures, to yield a film surface of appropriate surface energy to accept a second ink or fluid to be printed on it with adequate wetting and flow. In turn, the second ink must dry and, optionally, cure, to yield a film surface of appropriate surface energy to accept a third ink or fluid to be printed on it with adequate wetting and flow, and so on, until all the required inks or fluids have been printed and dried or, optionally, cured. A series of printable fluids or inks are designed such that the first ink or fluid printed has a dynamic surface tension within an appropriate range to wet and spread on the film substrate surface, the second fluid or ink printed has a dynamic surface tension within an appropriate range to wet and spread on the dried surface of the first ink, the third ink or fluid printed has a dynamic surface tension within an appropriate range to wet and spread on the dried surface of the second ink, and so on, until all the required inks or fluids have been printed and dried or, optionally, cured. Preferred ranges of dynamic surface tension are 26-52 dyn/cm, more preferably 28-38 dyn/cm.

One example of such a finished device is a control panel of an appliance, which may contain graphic design, lettering, as well as functional electronic devices, such as sensors, lighting, displays, or capacitive switches, all built into a streamlined three-dimensional assembly to replace a mechanical system. Original Equipment Manufacturers (OEMs) are increasingly interested in replacing a wired console with a fixed device that contains no moving parts or mechanical switches. The advantage of a sensor or capacitive switch built into a fixed device is the reduced number of parts, the absence of mechanical switches, and simplified design. Capacitive switches are an advantage over touch sensitive switches because no force is needed to activate the switch, and there are no moving parts. A capacitive switch can be built into a three-dimensional assembly, such as a control panel on an appliance, using an in-molded process. This technique allows an integrated structure with the benefits of a capacitive switch without the difficult alignment and assembly processes normally associated with an embedded capacitive switch in a control panel. In one embodiment of this invention, a graphic layer is printed on the reverse side of the substrate as printed indicators relating to the function of the embedded capacitive switch. This requires a layering of graphic and conductive inks on the substrate film to be thermoformed. The thermoformed piece is then placed into an injection mold and molten plastic is injected into the mold to form a rigid plastic support structure attached to the film. Advantages of printed electronic circuitry in a three-dimensional in-molded device include a reduction in size and weight of wired assemblies, such as automotive parts and appliance control panels, improved ruggedness over mechanical switches or membrane switches. OEMs can produce a more streamlined appearance with this technique. Such in-molded capacitive switches find applications in automotive interior panels such as center stack consoles, radio consoles, HVAC switches, or keyless entry circuits. In appliances with touch panel switches, applications include control panels.

The printed functional layers (including graphics, electronic inks and dielectric coatings) should be similar enough in chemical composition so that they adhere well to each other, and have similar elongation and shrinkage properties. However, contradictory to this is the requirement that the printable fluid layers are sufficiently incompatible so that the stack printed layers do not resolubilize adjacent layers, especially that of the printed conductive ink. The resolubilization of or by the printed conductive layer by the base layer or overlying layer is likely to cause a sharp decrease in conductivity of the printed circuit. Another requirement is that the printed circuit maintains high conductivity following the thermoforming step, in which the printed circuitry is subject to elongation of its printed dimensions.

However, for the realization of this multi-layered functional part, a compatible system of printable fluids is required that will allow serial application of decorative and functional printed layers. The first step in solving this problem is to use a first-down graphic ink on a surface of a transparent substrate that will not cause an increase in the resistance of a subsequent adjacent printed layer of conductive ink on top of this base layer of graphic inks. This is achieved by using two layers that are incompatible in terms of solubility, but which are compatible in terms of adhesion and elongation. The first-down graphic layer used is preferably an energy curable ink with a polycarbonate oligomeric backbone. Once this layer has been cured, the monomers and oligomers have reacted to form a crosslinked covalently bonded film which cannot be resolubilized by the solvents present in a next-down printed layer, such as that of a conductive ink that contains solvent based or water based resins in any proportion.

The conductive layer to be printed on top of this graphic ink layer, and which formulation is an object of the present invention, may thus be a solvent-based or water-based thermal cure system, a part-solvent-based or part water-based thermal cure ink that contains part energy curable resins (a so-called "hybrid system" or "hybrid ink"), or an all energy curable system. A solvent-based thermally curable system is preferable in cases that demand very high conductivity of the printable circuit. This is because a very low bulk resistivity can be achieved for a printed circuit using certain formulated examples of conductive ink. The use of a solvent or water based conductive ink is permissible because the first-down graphic layer is an energy curable layer, and the solvents of the conductive ink layer cannot re-solubilize the first layer and thereby short out the conductive layer or increase the resistance. The resins, however, must be chosen to optimize for not only the highest possible conductivity of the printed electronic circuit, but also for adhesion to the substrate and elongation and shrinkage profile that match that of the graphic ink layer. To achieve this, a vinyl resin is preferably used, such as a vinyl chloride or vinyl acetate type or a vinyl chloride/vinyl acetate. In addition, the vinyl resin may have functional groups, such as a carboxyl modified or epoxy modified, or a hydroxyl-modified vinyl resin. The vinyl resin may have a glass transition temperature (Tg) in the range of 30° to 120° C., or preferably in the range of 50° to 90° C. A plasticizer may be used, such as an epoxidized soybean oil or other epoxies, as well as phthalates, adipates, sebacates, citrates, phosphates, dibenzoates, dicarboxylates, isosorbide diesters, acetylated monoglycerides of fully hydrogenated castor oil, or chlorinated paraffins. Examples of vinyl resins include, but are not limited to: Vinnol E 15/45 M TF (Wacker); Vinnol H 11/59; UM50; UMOH; VAOH; LPOH (Wuxi); combinations thereof; and the like.

The vinyl resin may be used in combination with a polyurethane resin, such as a low Tg polyurethane or polyurethane copolymer resin. A polyurethane homopolymer or copolymer with a Tg in the range of −60° C. to 75° C. may be used, or −55° C. to 25° C., and preferably a polyurethane co-polymer with a Tg in the range of −40° C. to −20° C. A blend of vinyl resins and polyurethane resins may be used. A water based conductive ink may also be used. Examples of polyurethane resins include, but are not limited to: Macroplast QC 4891 (Henkel); Estane 5703; Estane 5717 (Lubrizol); combinations thereof; and the like.

A polyester or co-polyester resin that can achieve high elongation without cracking and can maintain conductivity may be used alone or in combination with other resins. A polyester resin may be used in combination with any of the above mentioned vinyl resins. The polyester resin used alone or in combination may be linear or branched, saturated or unsaturated, amorphous or partly crystalline, and may have a molecular weight of 10,000 to 40,000, but preferably in the range of 15,000 to 36,000, and especially in the range of 15,000 to 28,000. The polyester resin may have a Tg in the range of 30° C. to 80° C., and preferably 40° C. to 70° C. Examples of suitable polyester resins include, but are not limited to: Vitel 2700B (Bostik); Dynapol L208 (Evonik); Vylon 103, Vylon 240, Vylon 630, and BX-7000A (Toyobo); combinations thereof; and the like. A particularly preferred material is Vylon 103, an amorphous linear polyester with a number average molecular weight of 23,000, a glass transition temperature of 47° C., and OH value of 5 mg KOH per gram of sample.

In some instances it may be preferable to use a UV curable conductive ink. In this case the resin composition may be selected to be similar to that used in the graphic inks. In this way, the conductive ink and the graphic inks are matched in terms of elongation and will not crack or delaminate due to differences in flexibility and elongation. An alternative UV curable resin system based on cationic curing may also be used. In another embodiment of the invention, a hybrid conductive ink may be used in which a solvent based or water-based thermal cure resin and a chemically compatible energy curable resin may be blended to formulate a hybrid cure conductive ink, which is cured using a combination of UV or EB radiation and infra-red or thermal energy. A cationic energy curable resin may be used which contains an aliphatic monomer, such as a cycloaliphatic epoxide, or a cycloaliphatic epoxide, such as Cyracure UVD6105, blended with flexible oligomers, such as polybutadiene dimethacrylate.

Once the conductive circuit is printed, the circuit is preferably insulated, and this is achieved by layering with a printable dielectric layer as the third down layer in the printed stack. The dielectric layer must be formulated so that it does not interfere with the underlying layer. In other words, the dielectric layer that is printed on top of the dried conductive layer must contain no solvents or a very small amount of solvents that would resolubilize the conductive layer, so that the conductive underlying layer cannot be re-solubilized, which would cause an increase in resistivity of the circuit. The dielectric layer chosen is preferably formulated as an energy curable low-solvent or no-solvent insulating coating. It can be based on an energy curable resin comprising an acrylated polyurethane with a polycarbonate backbone, or upon a blend of energy curable resins with solvent- or water-based resins similar to those used in the formulation of the conductive ink. A dielectric coating may be based on solvent based resins similar to those used in the conductive inks. An insulating dispersed phase may be used in combination with the energy curable resins, including, but not limited to, titanium dioxide, fumed silica, talc, clays, or strontium titanate; combinations thereof, and the like.

By alternating solvent-free and solvent- or water-based layers in a printable stack, and by careful formulation of the non-solvent based layers, the very low resistance properties of a solvent-based printable electronic circuit can be achieved while still realizing the advantages of the energy curable layers, permitting the entire printed stack to be thermoformed and injection-molded without cracking or delaminating.

To date, the full utilization of this method has been hampered by the material limitations of the inks required to achieve the finished part. The printed circuit requires in many applications a high degree of elongation for thermoforming, while still maintaining adhesion to the substrate or the decorative printed layers. The printed circuit must also retain a very low sheet resistance after the thermoforming process, and cannot undergo cracking, since the circuit could not be maintained if cracks form during the process. In addition, the printed circuit requires in most cases insulating layers to be printed in additional layers on top. Subsequent or underlying layers could cause delamination or shorting of the printed circuit. These are very high demands for a printed stack that is comprised of decorative layers, conductive layers, and insulating or dielectric layers. These problems may derive partly due to rewetting of interfacial surfaces during fabrication, which can short the circuit and cause delamination. The polycarbonate substrate is very sensitive to solvents, and must be addressed. In addition, the printed stack must have a high heat resistance to withstand the in-molding step which provides rigidity to the part.

The present application describes a method of solving these problems by taking advantage of the non-interference of adjacent layers in a printed stack, and by selecting the resins which have been discovered to have high conductivity, high elongation without cracking, and resistance to high temperature washout of the printed layers during the in-molding step. The solution is provided in the use of layers that are formulated so that any resolubility of subsequent printed layers is prevented. This involves the use of a UV curable set of graphic or decorative inks as a first-down layer. The conductive ink is formulated as a thermal cure solvent based fluid, or an energy curable resin-thermal cure resin hybrid, or an ink based only upon an energy curable resin or blend of energy curable resins. The subsequent dielectric insulating layer is an energy-curable layer, or a water-based or solvent-based energy curable hybrid formulation, or a formulation based upon a solvent-based or water based resin that is formulated to match the elongation properties of the graphic and conductive ink layers, and such that it does not resolubilize the underlying conductive ink layer.

The three parts of this printable system will be described separately in the following discussion.

Graphic or Decorative Layer

A preferred decorative or graphic layer ink is one comprising an acrylated polyurethane with a polycarbonate backbone (such as those described in U.S. Pat. No. 7,763, 670). However, other decorative inks printable by processes such as screen printing, pad printing, flexography, lithography, ink jet, xerography, or gravure printing, and which are well-known to those skilled in the art, are also useful in this invention.

Conductive Layer

The conductive layer is used to create the electronic circuitry of the functional part. The conductive ink may be based on an energy-curable resin system similar to that used to formulate thermoformable graphic inks. In cases where a heavy layer of conductive ink is used, such as with screen printing, which deposits ink films in the range of 5 to 30 microns, a high metal loading may lead to difficulty in achieving full through-cure. The UV-curable or energy curable conductive inks of this invention, however, are formulated to allow post curing with subsequent heating. The proposed method of using a UV curable resin for a conductive ink offers commercial advantages in that the throughput is theoretically higher and the equipment used is already established for a production facility using screen printing with belt drying, box oven drying, and UV curing. Alternately, the conductive ink may be a water based ink, such as is described in Sun Chemical patents U.S. Pat. Nos. 8,709,288 and 8,709,289. Other conductive inks, comprising silver, copper, or carbon, which are well-known to those skilled in the art, may be employed. Said inks may be printable by a variety of techniques, including but not limited to screen printing, pad printing, flexography, lithography, ink jet, xerography, or gravure printing.

Another embodiment of this invention involves a conductive ink based on a solvent-based binder and which contains a conductive powder, such as silver, copper, gold, silver coated copper, bimetallic powders, graphite, graphene, carbon nanotubes, or other carbon allotropes, other metals or metal oxides, or other conductive powders; combinations thereof; and the like. The solvent based binder is preferably based on a vinyl resin or combination of vinyl resins, or a blend of a vinyl resin with a low Tg high-elongation polyurethane, or a combination of polyurethanes, or a combination of vinyl resins with polyurethanes, or on a polyester resin, or co-polyester resin, or a blend of polyester or co-polyester with vinyl and/or polyurethane resins.

In another embodiment, a conductive ink is formulated using a blend of compatible thermally curable solvent-based resins with energy-curable resins, such as those described in the UV curable conductive ink of the first embodiment. Examples of suitable solvent-based resins include, but are not limited to, vinyl resins, urethanes, and polyesters. The process of post-curing an energy-curable conductive ink can be even further enhanced by using a hybrid system which allows additional cure to be achieved during a heating phase, which can be carried out at the time of printing, or which occurs during thermoforming. Additional cure may be by oxidative means, via a cross-linking process, or by solvent evaporation. The inclusion of energy-curable resins helps to improve the elongation properties.

In another embodiment, a conductive ink is formulated using an energy curable formulation based solely on cationic curable resins, or cationic resins blended with solvent-based resins. The use of a cationic energy curable system allows for the through curing of even a thick printed layer, such as a conductive screen printed ink, which has been shown to undergo post-curing either with heat or at room temperature, and with an accompanying decrease in sheet resistance.

The present application is also directed to printable formulations for conductive inks and dielectric coatings that are compatible with high-performance energy curable graphic or decorative inks. Other dielectric inks well-known to those skilled in the art may also be employed. Said inks may be printable by a variety of techniques, including but not limited to screen printing, pad printing, flexography, lithography, ink jet, xerography, or gravure printing.

The conductive ink may comprise one or more of a vinyl resin, a polyurethane resin, a polyester resin, or an energy curable resin composition comprising an acrylated polymer or oligomer having an aromatic or aliphatic polycarbonate backbone. For example, the conductive ink may be comprised of a vinyl resin or a blend of a vinyl resin and a high-elongation polyurethane or a flexible polyurethane or a polyester-polyurethane copolymer.

The polymer resin may be present in the conductive ink or coating in an amount of from about 0.5 wt % to about 50 wt %; or from about 1 wt % to about 50 wt %; or from about 1 wt % to about 20 wt %; or from about 2 wt % to about 10 wt %. For example, the polyurethane resin may be present in the range of 0.5% to 15% by weight, but preferably in the range of 2.0% to 4.5%. The vinyl resin may be present in the range of 2% to 15% by weight, but preferably in the range of 7.5% to 11.5%.

Because a thermoformed print will undergo deformation and elongation as part of the process, the requirement is that the printed circuitry should have a maximum conductivity to allow for increased resistance after thermoforming. Normally, a higher conductivity is achieved by using a higher percentage of conductive filler, for example a silver powder or flake. However, a higher loading of conductive powder will reduce the ability for thermoforming without cracking. A higher percentage of binder improves the thermoformability.

In one embodiment, an ink formulated with a vinyl copolymer or terpolymer and a low Tg polyurethane has unique properties. The use of a vinyl-polyurethane resin system combines the higher conductivity of the vinyl polymer with the high flexibility and elongation property of a low Tg polyurethane. This formulation also has very good adhesion, allowing a stacked configuration necessary for fabricating a functional part. A conductive ink based on this combination of polymeric resins may be printed on a flexible substrate, such as polycarbonate, and can be thermoformed into a three-dimensional shape, and still maintain its conductivity. Such an ink or coating can also be printed in a stacked configuration of ink/coating layers, which include graphic ink layers, and dielectric insulating layers. This printed stack can be subsequently injection molded without delamination and washout.

The conductive ink also contains a conductive inorganic dispersed component. The conductivity can be improved by the careful selection of conductive powder. The powder could be silver, copper, a combination of metals, such as silver coated copper, carbon, bimetallic powders, or other conductive materials. The conductive powder may be spherical particles, flakes, rods, wires, nanoparticles, or a combination of these. The metal powder in one example has a specific surface area of 0.9 to 1.4 $m^2/g$, and in another example 2.2 $m^2/g$. The silver powder may have a specific surface area of 0.5 to 2.9 $m^2/g$. Examples of conductive powders include, but are not limited to: Silflake 135 (Technic); SF-29 (Ames Advanced Materials); SF-3; SF-3J; SF-C (Ames Goldsmith); RA-0127; AA-3462; P629-3; P629-4; AC-4044; SF-11 (Metalor); combinations thereof; and the like.

The conductive powder may be present in an amount of from about 25% to about 75%, based on the total weight of the ink or coating. For example, the conductive powder may be present in an amount of from about 30 wt % to about 70 wt %; or from about 45 wt % to about 65 wt %; or from about 40 wt % to about 55 wt %.

The vinyl-urethane formulation can be enhanced by adding a third resin component, an energy curable resin, resulting in a thermal curing-energy curing hybrid ink or coating. The energy curable resin is preferably an acrylated resin with a polycarbonate backbone. This resin is the same component in the graphic thermoformable ink forming part of the printed stack for the functional devices described herein. This energy curable resin is also useful as the binder in forming a dielectric coating layer which forms part of the printed stack for the functional devices described herein.

It has been discovered that blending an energy curable resin of this type can improve the thermoformability of a solvent-based thermal cure formulation. Up to a certain level, the inclusion of this resin can still maintain the ability of the ink to be injection molded without washout. If a vinyl-polyurethane thermally curable ink has about 25% of its binder system replaced with the free-radical energy curable resin, then about a 25% elongation can be achieved without cracking, and the printed circuitry can still withstand injection molding without washout. If a vinyl-polyurethane thermally curable ink has about 75% of its binder system replaced with the free-radical energy curable resin, then the printed circuitry has only fair resistance to washout during injection molding. This means that for higher melting temperature injection molding plastics, or in areas where the circuitry does not have a dielectric coating covering it, or for high pressures during injection molding, some of the ink lines can shift or "wash" off the substrate, resulting in damage to the printed conductive circuit.

It has also been found that certain polyesters can be blended with the vinyl-polyurethane formulations to achieve high elongation, conductivity, and washout resistance. The polyesters may be linear or branched; saturated or unsaturated; have molecular weight averages in the range of about 10,000 to about 36,000 or higher; have hydroxyl values of about 2 to 10 mg KOH per g sample; and have glass transition temperatures in the range of about 40° C. to about 70° C. Optimally, the polyester should be linear, saturated, and have a number average molecular weight in the range of 15,000 to 25,000, a Tg in the range of 42° C. to 65° C., and a hydroxyl number of 3 to 6 mg KOH/g sample.

Certain polyester resins as described herein may also be used as the sole resin in a formulation. These polyester resins have sufficient elongation properties and conductivity to meet the material requirements of thermoformable conductive applications. The molecular structure of these polyester resins is particularly suited to elongation. This is believed to derive from a higher proportion of linear structure, as opposed to a structure which is very highly branched. Some degree of branching may, however, be tolerated, and could improve adhesion to the substrate.

A vinyl-polyurethane based formulation may have a percentage of conductive powder in the range of about 30% to about 70%, although a lower percentage of conductive powder will favor better thermoformability without cracking. The vinyl-polyurethane based formulation may have about 35% to about 65% conductive powder. Optimally, a range of about 40% to about 55% conductive powder has shown the best combination of conductivity, thermoformability, and washout resistance in a vinyl-polyurethane formulation, or in a vinyl-polyurethane and part energy curable hybrid formulation.

A formulation based on polyester or part polyester may include higher percentages by weight of conductive powder and still maintain high elongation properties. The percentage of conductive powder in a polyester resin containing formulation may be about 40% to about 75%, or about 40% to about 65%, but is optimally about 45% to about 60%. The flexibility and molecular structure of this family of polyesters allows a higher loading of conductive powder.

The conductive ink may be comprised of a blend of vinyl resins or a blend of polyurethane resins. A plasticizer may be present in the range of 0.05% to 5%. The plasticizer may be present in an amount of from about 0.1% to 3%, or about 0.2% to about 4%.

In one example, the vinyl resin solids can be in the range of about 0.5% to about 50%, or from about 0.8% to about 25%, but preferably in the range of about 1% to about 10%. Also included is a polyurethane resin present at about 1% to about 50%, or about 1.5% to about 30%, but preferably in the range of about 2% to about 10%.

In another example a system comprises a blend of vinyl resin and polyester resin. The vinyl resin may be present in the range of about 1% to about 40%, or from about 5% to about 20%, but is preferably in the range of about 8% to about 12%. The polyester resin may be used in the range of about 0.5% to about 30%, or from about 0.8% to about 10%, but is preferably used in the range of about 1% to about 5%. The resin may also comprise a plasticizer. A vinyl plasticizer is present at about 1% to about 40%, or from about 1.5% to about 20%, but preferably in the range of about 2% to about 5%. A conductive powder may be used in the range of about 25% to about 70%, or from about 30% to about 70%, but preferably in the range of about 40% to about 65%. A dispersant additive may be present in the range of about 0.1% to about 6%, or from about 0.2% to about 5%, but preferably in the range of about 0.25 to about 3%.

In another example, the conductive ink may comprise a radiation cure, also referred to as an energy cure, system of monomers and oligomers. In one example the conductive ink contains acrylated resins. The system may be initiated by free radical initiators. The resins may contain oligomers with a polycarbonate backbone and acrylate functionality. The conductive ink may also contain cationic initiated cycloaliphatic monomers or a blend of cationic initiated cycloaliphatic monomers and functional flexibilizing oligomers or extenders.

In one example the conductive ink comprises a blend of acrylated monomers, a vinyl resin, a plasticizer, and a polyurethane copolymer. In another example, the conductive ink comprises a polyester resin. The ink may also contain reactive diluents. The ink may also contain flexibilizing extenders.

The ink may also contain organic or inorganic rheological modifiers and also various dispersants or other additives to enhance conductivity, screen printability or other surface properties, such as wetting or leveling. Examples include, but are not limited to: Byk E410; Byk 1790; Byk 392; Disperbyk 108; Byk 057 (Altana); Tyzor AA-75 (DuPont); hydroquinone; SAG 100; AF9000 (Momentive); Foamblast UVD (Emerald Performance Materials); combinations thereof, and the like. The ink may also contain solvents, such as those typically used for polymer thick film silver (PTF silver) inks or screen printable graphic inks. Typical solvents include but are not limited to esters, glycol ethers, ketones, acetates, alcohols, water, combinations thereof, and the like. Examples of suitable solvents include, but are not limited to: 2-methoxyethanol; 2-ethoxyethanol; 2-propoxy ethanol; 2-butoxy ethanol; 2-butoxyethyl acetate; 2-(2-ethoxyethoxy)-ethyl acetate; ethyl diglycol acetate; 1-methoxy-2-propanol; 1-methoxy-2-propylacetate; dibasic esters; 1-propoxy-2-propanol; 1-butoxy-2-propanol; ethoxypropanol; (3-ethoxy-1-propanol); propylene glycol diacetate; 2-(2-butoxyethoxy)-ethanol; 2-(2-butoxyethoxy)-ethanol acetate; 2-(2-methoxypropoxy)-1-propanol; 1-(2-methoxypropoxy)-2-propanol; 4-hydroxy-4-methyl-2-pentanone; propylene glycol monomethyl ether acetate; diethylene glycol monomethyl ether; diethylene glycol monopropyl ether; ketones, such as gamma-valerolactone, gamma-butyrolactone, or cyclohexanone; combinations thereof; and the like.

Insulating Layer

The insulating or dielectric layer is a printable fluid formulated to be compatible with the graphic first down layer, as well as with the conductive second down layer. Because the second layer conductive ink may only partially cover the entire printed area of the first layer, the third printed layer must be compatible with graphic printed and dried layers, as well as the printed and dried conductive circuitry of subsequent printed layers, and also the unprinted substrate. In many areas the insulating layer will make direct contact with the graphic printed layers, and the unprinted substrate, as well as that of the conductive printed circuit.

The dielectric ink or coating is formulated using a similar energy curable resin as that used in the graphic layer. But in order to be highly insulating to meet the range of requirements of various devices, the dispersed phase is selected to be any of a number of insulating compounds. Such compounds may include, but are not limited to, titanium dioxide, silica, fumed silica, polyamide waxes, micronized polyamide waxes, strontium titanate, clays, combinations thereof, and the like. Clays may include kaolinite, bentonite, bentone, illite, muscovite, chlorite, montmorillonite and the like, and may also include polymeric complexes of clays.

The dielectric coating may contain fumed silica, in the range of about 0.01% to about 30%, or from about 0.02% to about 25%, preferably in the range of about 0.05% to about 20%. The silica includes treated silica such as hydrophobic or hydrophilic silica; and clay, such as a kaolinite clay, bentonite, bentone, illite or muscovite, or chlorite, or a montmorillonite type clay, such as for one example a talc, in the range of about 0.1% to about 20%, or from about 1% to about 18%, preferably in the range of about 5% to about 15%. An organoclay may also be used in the range of about 0.1% to about 12%, or from about 0.2% to about 10%, but preferably in the range of about 1% to about 5%.

The dielectric ink or coating may also contain colorants. Suitable colorants include, but are not limited to, organic or inorganic pigments and dyes. The dyes include but are not limited to azo dyes; anthraquinone dyes; xanthene dyes; azine dyes; combinations thereof; and the like. Organic pigments may be one pigment or a combination of pigments, such as for instance Pigment Yellow Numbers 12, 13, 14, 17, 74, 83, 114, 126, 127, 174, 188; Pigment Red Numbers 2, 22, 23, 48:1, 48:2, 52, 52:1, 53, 57:1, 112, 122, 166, 170, 184, 202, 266, 269; Pigment Orange Numbers 5, 16, 34, 36; Pigment Blue Numbers 15, 15:3, 15:4; Pigment Violet Numbers 3, 23, 27; and/or Pigment Green Number 7; combinations thereof, and the like. Inorganic pigments may be one of the following non-limiting pigments: iron oxides, titanium dioxides, chromium oxides, ferric ammonium ferrocyanides, ferric oxide blacks, Pigment Black Number 7 and/or Pigment White Numbers 6 and 7; combinations thereof, and the like. Other organic and inorganic pigments and dyes can also be employed, as well as combinations that achieve the colors desired. Colorants with a high heat resistance are preferred. Optical brighteners may also be used. Colorants may be included in the range of 0.01% to 50%. For example, colorants may be present in an amount of 0.05% to 40%; or from about 1% to about 30%. The dielectric layer may contain no colorants or fillers, consisting of a clear coating or a clear coating with an optical brightener or combination of optical brighteners.

The dielectric ink or coating may also contain various additives to improve the rheology and printability of the coating. The dielectric coating may contain additives such as stabilizers and reactive enhancers. The dielectric ink or coating may also contain solvents. The solvents used include various high boiling glycol ether solvents and may include others.

Properties of Printed and Thermoformed Conductive Inks

Figure 5:
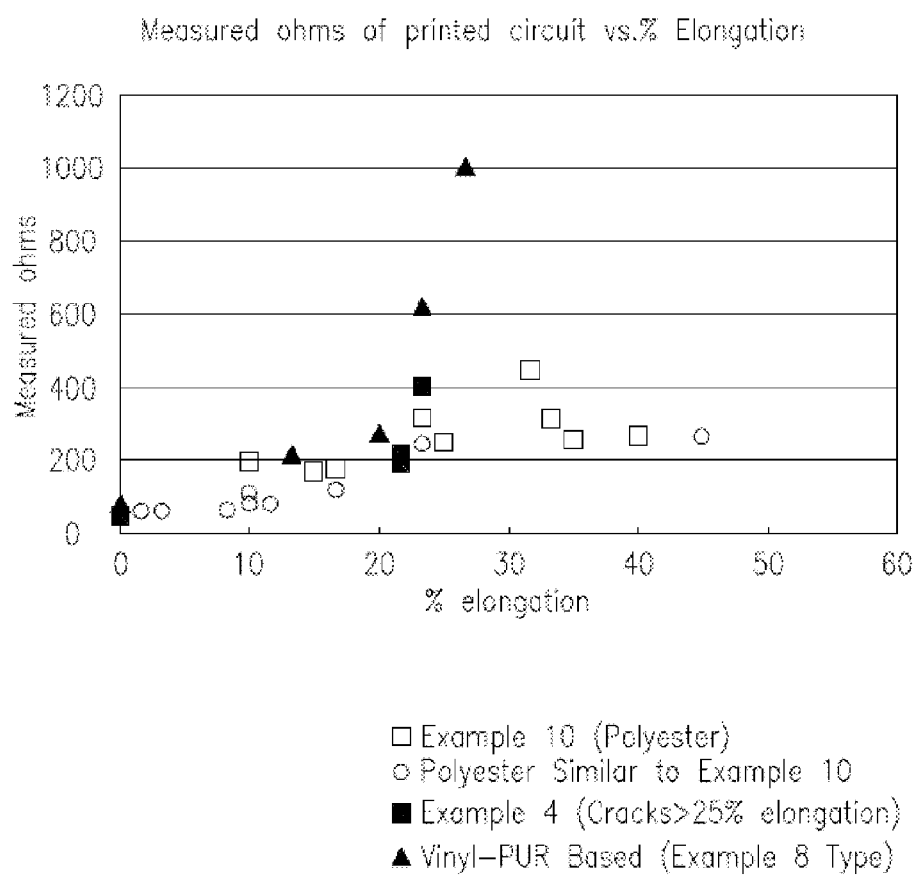
FIG. 5 shows the measured resistance of printed 600 squares resistor as a function of % elongation after thermoforming. Inks that contain polyesters in their formulations are represented by the open symbols; inks that are based on vinyl-polyurethane formulations are represented by filled symbols.

FIG. 5 shows the unusual property of two different polyesters which permit higher percent elongation when used in formulating in-mold electronic inks, without a large increase in sheet resistance. Inks that contain these polyesters in their formulations are represented in the figure by the open symbols. Inks that are based on vinyl-polyurethane formulations are represented by filled symbols.

FIG. 5 describes the change in measured resistance of printed 600 squares resistors on polycarbonate as a function of the percent elongation of the thermoformed prints. The percent elongation is determined by measuring the length of the printed resistors before and after thermoforming. The resistance of the printed resistor is expressed in ohms, as measured using a two-probe multimeter following the thermoforming of the print. The filled markers (Example 4 and another vinyl-polyurethane based ink similar to that described by Example 8) are representative of the thermoforming behavior of the solvent based inks which are one object of the invention for this patent. These solvent based inks are vinyl-polyurethane inks, and they perform very well up to deformations of about 20-25% elongation. These solvent based inks are well-suited for many thermoforming applications. The polyester-based inks (open markers) show the surprising property of being capable of higher % elongation, up to about 45%. These inks are well-suited for thermoforming applications where a higher percent elongation is required.

Figure 6:
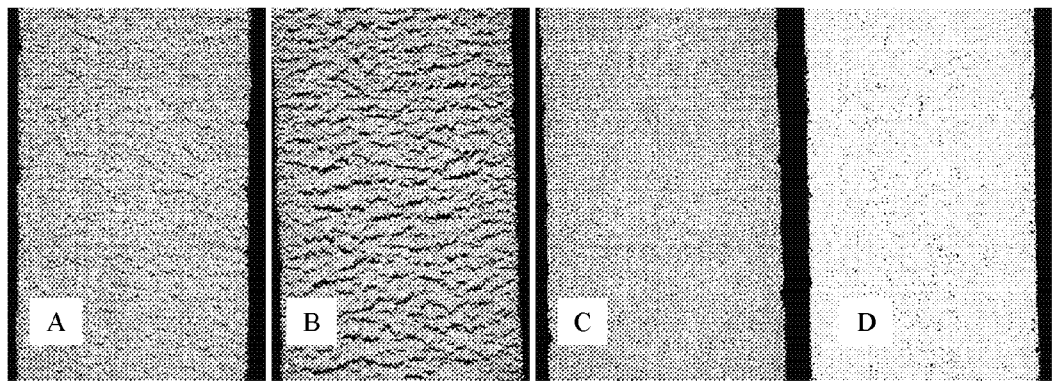
FIG. 6 illustrates the optical photomicrographs (5×) showing a 1 mm wide line of a 600 squares printed resistor after thermoforming of vinyl based and polyester based formulations.

FIG. 6 shows four optical photomicrographs of printed resistor lines (1 mm width) after thermoforming. The images were collected using dark field illumination with a 5× magnification objective. Images A and B show vinyl-polyurethane based inks at 20% and 22% elongation respectively. At 20% elongation these systems show minimal evidence of micro-cracking. However, at greater % elongation—for example, 22% as shown in the image B—the limits of elongation are observed as cracking. These small observable cracks are reflected in higher resistance measurements as seen in FIG. 5. Images C and D of FIG. 6 are photomicrographs of polyester-based ink formulations. Even at higher % elongations after thermoforming, these polyester-based inks do not show evidence of cracking. Vinyl-polyurethane inks similar to those shown in FIGS. 6A and 6B are well suited for applications requiring 20% or less elongation during thermoforming, and for those applications where a dielectric coating may be used, which provides higher elongation without cracking. The data and images of FIG. 5 and FIG. 6 represent prints that have not been coated with a dielectric layer. The addition of a thermoformable dielectric coating, as discussed previously, improves the thermoformability of the conductive inks, extending the % elongation possible before cracking is observed.

Figure 7:
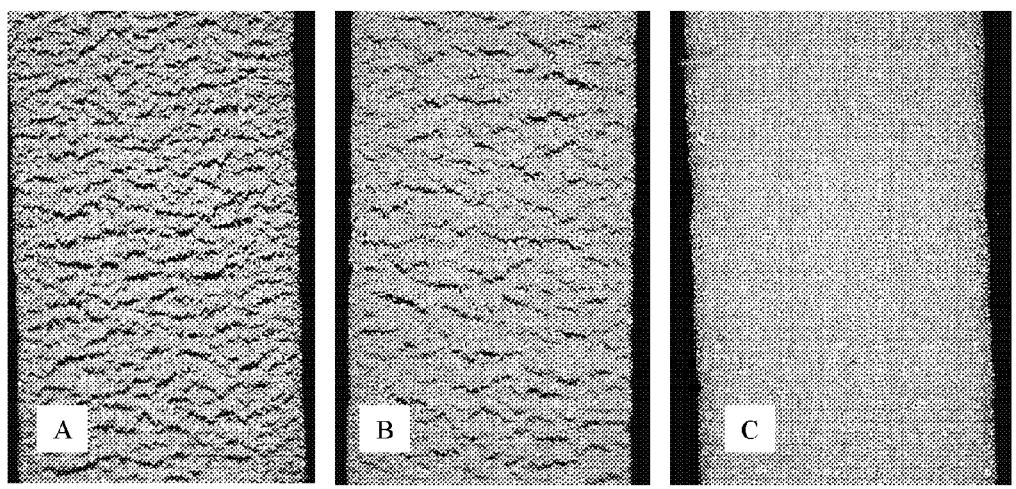
FIG. 7 depicts optical photomicrographs (5×) showing a 1 mm wide line of a 600 squares resistor after thermoforming of vinyl based and energy curable hybrid vinyl formulations.

FIG. 7 illustrates the benefit of using a UV hybrid to improve thermoforming. Image A in FIG. 7 shows cracking of a thermoformed print of a vinyl based formulation at 22 percent elongation. The cracking is reduced to some degree when 1% by weight of the formulation is energy curable resin, as shown in FIG. 7B. FIG. 7C shows no cracking in a print thermoformed to 32 percent elongation for a 10% UV-vinyl-based hybrid formulation.

EXAMPLES

The following examples illustrate specific aspects of the present invention, and are not intended to limit the scope thereof in any respect and should not be so construed.

Printing

Graphic Inks:

First down graphic inks (comprising an acrylated polyurethane with a polycarbonate backbone as described in Sun Chemical patent U.S. Pat. No. 7,763,670) were printed onto a polycarbonate substrate of 10-mil (254 μm) or 15-mil (381 μm) thickness (Bayer Makrofol DE film obtained from Curbell Plastics). The graphic inks were screen printed as a solid full-coverage area pattern and cured using a UV radiation curing unit fitted with a mercury vapor lamp, and a total exposure of about 750 mJ/cm².

Conductive Inks:

The conductive inks were next screen-printed on top of the graphic ink layer using a pattern of 600 squares resistors, and screen mesh of 110 to 325. The inks were printed to a thickness of 6 to 29 μm, depending on the type of screen used. The film thickness of the printed resistors was determined using scanning probe measurements (DekTak stylus profilometer) or interferometry (Veeco NT series optical profiler). The conductive inks were cured using either UV radiation or drying in an oven or both, depending on the formulation. For example, the thermal formulations were dried in an oven for 5 to 15 minutes at 120° C., and in some cases they were dried for one minute at 150° C. The energy curable formulations were cured using two passes through a UV radiation curing unit with a mercury vapor lamp for a total exposure of about 1500 mJ/cm². In some cases the inks were additionally heated in a box oven for 10 minutes at 120° C.

Dielectric Layer:

In some cases a white or clear dielectric layer (comprising an acrylated polyurethane with a polycarbonate backbone) was screen printed as a third layer on top of the conductive and graphic prints as a solid full-coverage area pattern and UV cured using a single pass or two passes through the UV curing unit. The screens were selected to leave an unprinted strip in the dielectric top coat in the area of the terminals of the printed resistors so that the resistance could be measured after coating with dielectric. In some cases the conductive ink was printed directly onto a polycarbonate substrate either with or without a dielectric or graphic layer.

Thermoformability

Thermoforming:

The printed inks were thermoformed by placing the printed polycarbonate sheet facing up in a thermoforming unit, in this case a Formech 300 XQ vacuum forming unit. The unit was closed with the printed sheet clamped inside and ceramic heaters facing the top of the printed sheet for about one minute, to heat the polycarbonate to a softening point. At the end of the heating interval, a vacuum was applied at the same time that the platform supporting the mold tool was raised to contact the heated sheet. The platform contains a heated forming tool in a desired shape that is compressed against the bottom of the polycarbonate sheet in order to thermoform the printed polycarbonate sheet into a three-dimensional shaped structure, which in turn may impose an elongation of the printed resistors (FIGS. 1-4). The platform was then lowered to its original position releasing the forming tool from the thermoformed sheet. The formed sheet was then removed from the unit and allowed to cool.

Resistivity:

The resistance in ohms of the printed resistors was measured before and after thermoforming using a two probe multi-meter. Before thermoforming the resistivity was reported in units of ohms per square per mil. The length of the printed resistors was measured after thermoforming to determine the % elongation. After thermoforming, the resistance was reported in ohms.

The resistivity of the printed circuits before thermoforming was calculated as follows:

Resistivity in mΩ/□/mil=[($\Omega_{meas}$)($d_{meas}$)/(600 squares)(25.4)]×1000 where ($\Omega_{meas}$) measured ohms of the printed 600 squares resistor pattern ($d_{meas}$)=measured printed film thickness in microns 25.4 is a conversion factor for microns to mils 1000 is a conversion factor for ohms to milliohms The measured resistance after thermoforming (to the % elongation indicated in the results tables) the 600 square resistor patterns is provided as a sheet resistance in ohms. Because the dimensions of the printed resistors change upon thermoforming and deformation, the resistance is expressed in measured ohms rather than as bulk resistivity values, which can be calculated when the dimensions of the printed resistors are known accurately.

Degree of Thermoformability:

The degree to which a printed ink can be thermoformed was determined by using a series of forming tools that could impose variable degrees of strain on a printed resistor, and evaluating the % elongation of a printed resistor using the definition of engineering strain: % elongation=[($L_f$−$L_i$)/$L_i$]*100% where $L_f$ is the final length after forming, and $L_i$ is the initial length of the printed resistor. The thermoformed printed resistors were observed for cracks using low magnification optical microscopy (5×) with dark field illumination.

Thermoformability (% elongation) was assessed as follows:

Poor: cracking at less than 5% elongation

Fair: 5% to 10% elongation without cracking

Good: 11% to 24% elongation without cracking

Very Good: 25% to 39% elongation without cracking

Excellent: greater than or equal to 40% elongation without cracking

Washout Resistance:

The washout resistance of an ink was evaluated by overmolding the printed resistors with various plastics, such as PBT (polybutylene terephthalate); PC (Makrolon 2407 polycarbonate supplied by Bayer Materials Science); DuraStar 1010 (a copolyester supplied by Eastman); and Cycoloy C1000HF PC/ABS blend (acrylonitrile butadiene styrene+polycarbonate supplied by Sabic). The printed conductive lines were evaluated for signs of melting or flowing off the substrate; of dislocation from the printed surface; of ink spreading; or any change in shape or size of the printed area due to melting or pressure or other degradation due to the injection molding process.

The injection molding tests were performed at several locations where injection molding of plastics is routinely done for commercial purposes. In one location an 88 ton Battenfeld unit was used with barrel temperatures in the range of 530° to 550° F. in each of four zones.

Washout resistance was assessed as follows:
Poor: a significant portion of the print (an area of greater than or equal to 10% of the printed circuit) smears or flows after injection molding, or is dislocated by about 0.5 mm or more.
Fair: slight movement of printed lines can be detected after injection molding. A slight movement of lines is defined as a small shift of the printed circuitry that is visible on close inspection, and is in the range of about 0.5 mm or less from the original printed position.
Excellent: all printed lines intact in all areas after injection molding Materials The following materials were used in formulating the conductive inks:
(1) IRR 538 in isobornyl acrylate (Cytec);
(2) Estane 5703 (Lubrizol);
(3) Cyracure 6105 (Dow Chemical);
(4) Polybutadiene dimethacrylate, CN303 (Sartomer);
(5) Vikoflex 7170 (Arkema);
(6) Vinyl terpolymer resin UMOH (Wuxi);
(7) Vylon 103 (Toyobo);
(8) Dynapol L208 (Evonik);
(9) Epon 1009F (Hexion);
(10) PKHH phenoxy resin (In Chem);
(11) Irgacure 819 (Ciba);
(12) Irgacure 184 (Ciba);
(13) Darocure TPO (Ciba);
(14) Omnicat BL550 photoinitiator (IGM Resins);
(15) Genorad 16(Rahn);
(16) AF 9000 antifoam (Momentive);
(17) Foamblast UVD (Emerald Performance Materials);
(18) Byk E410 (Altana);
(19) Disperbyk 108 (Altana);
(20) Byk 361N (Altana);
(21) Tyzor AA-75 (Brenntag Specialties);
(22) SF29 (Ames Advanced Materials);
(23) SF11 (Ames Goldsmith); and
(24) SF3 (Ames Goldsmith).

Examples 1 to 7. Energy-Curable and Hybrid Energy-Curable/Solvent Based Conductive Inks Energy-curable and hybrid energy-curable/solvent based conductive inks were prepared according the formulations in Table 1. Example 1 is a comparative ink that contains only UV curable resins as the binder. Examples 2 to 5 are thermoformable hybrid (free-radical) energy-curable/solvent based binders. Examples 6 and 7 are inks containing cationic energy-curable resins.

TABLE 1

Formulation of Examples 1 to 7

| Materials | UV curable All UV Ex. 1 | 75% UV Hybrid Ex. 2 | 25% UV Hybrid Ex. | 1% UV Hybrid Ex. 4 | 10% UV Hybrid Ex 5 | Cationic UV Ex. 6 | Cationic UV Ex. 7 |
|---|---|---|---|---|---|---|---|
| Acrylated resin (1) | 34.50 | 25.40 | 8.29 | 0.77 | 7.66 | | |
| Polyurethane resin (2) | | 0.67 | 2.00 | 3.30 | 2.75 | | |
| Cycloaliphatic epoxide (3) | | | | | | 31.10 | 24.00 |
| Flexible oligomer (4) | | | | | | | 5.00 |
| Expoxidised soybean oil (5) | | 0.08 | 0.24 | 0.40 | 0.33 | | |
| Vinyl terpolymer resin (6) | | 1.85 | 5.68 | 9.55 | 7.92 | | |
| N-vinyl pyrrolidone | 5.80 | 4.28 | 1.40 | 0.15 | 1.54 | | |
| □-butyrolactone | | 6.48 | 19.84 | 33.19 | 27.55 | | |
| cyclohexanone | | 1.25 | 3.90 | 6.56 | 5.45 | | |
| Photoinitiator (11) | 1.25 | 0.92 | 0.30 | | | | |
| Photoinitiator (12) | 0.58 | 0.43 | 0.14 | | | | |
| Photoinitiator (13) | | | | 0.06 | 0.60 | | |
| Photoinitiator blend (14) | | | | | | 4.40 | 5.00 |
| UV inhibitor (15) | 0.22 | 0.16 | 0.05 | 0.01 | 0.05 | | |
| Antifoam (16) | 0.65 | 0.48 | 0.16 | 0.01 | 0.15 | | |
| Antifoam (17) | | | | | | | |
| Dispersant (18) | | 1.00 | 1.00 | | | | |
| Dispersant (19) | | | | 1.00 | 1.00 | | |
| Leveling agent (20) | | | | | | | 1.00 |
| Silver flake (22) | 57.00 | | 57.00 | | | | |
| Silver flake (23) | | 57.00 | | 45.00 | 45.00 | 64.50 | 65.00 |
| Total | 100.00 | 100.00 | 100.00 | 100.00 | 100.00 | 100.00 | 100.00 |

The inks of Examples 1 to 7 were printed and cured (as indicated in "Curing conditions" in Table 2). The curing conditions indicate which inks were coated with a dielectric layer. The inks were then tested as described above. The results are shown in Table 2.

TABLE 2

Resistivity and thermoformability of Examples 1 to 7

| Curing conditions | Examples | Resistivity of printed 600 square resistors, mΩ/□/mil | Printed film thickness, μm | Sheet resistance of 600 squares resistor before elongation, Ω | Sheet resistance of 600 squares resistor at elongation, Ω | % elongation | Thermo-formability (% elongation) | Washout resistance |
|---|---|---|---|---|---|---|---|---|
| 2 pass UV curing (dielectric coating) | Example 1 - UV conductive | unstable | 13 | unstable | unstable | >30 | Very good | poor |
| 2 pass curing + 120° C./10 min (dielectric coating) | Example 2 UV Hybrid 75% UV | 106 | 23 | 70 | 800 | 25% | very good | fair |
| 2 pass curing + 120° C./10 min (dielectric coating) | Example 2 UV Hybrid 75% UV | 106 | 23 | 70 | 61 | 15% | good | fair |
| 2 pass curing + 120° C./10 min (dielectric coating) | Example 3 UV Hybrid 25% UV | 26 | 14 | 28 | 100 | 25% | very good | excellent |
| 2 pass curing + 120° C./15 min | Example 4 UV Hybrid 1% UV | 29 | 9 | 49 | 200 | 22% | good | excellent |
| 2 pass curing + 120° C./15 min (dielectric coating) | Example 4 UV Hybrid 1% UV | 37 | 8.6 | 65 | 280 | 27% | very good | excellent |
| 2 pass curing + 120° C./15 min | Example 5 UV Hybrid 10% UV | 45 | 10.8 | 63 | 460 | 25% | very good | excellent |
| 2 pass curing + 120° C./15 min (dielectric coating) | Example 5 UV Hybrid 10% UV | 56 | 11 | 78 | 450 | 32% | very good | excellent |
| 2 pass curing + 120° C./10 min | Example 6 Cationic UV Conductive | <380 | 11.6 | 498 | NA | NA | poor | excellent |
| 2 pass curing ambient post-cure, 1 week (dielectric coating) | Example 7 Cationic UV Conductive | 870 | 10 | 1320 | 375 | 10% | fair | excellent |

The results for comparative Example 1 show that for the formulation based entirely on energy curable resins the conductivity of the printed resistor is unstable even though the elongation is very good. Also, the difficulty of fully curing by free radical UV a thick film of ink with a high loading of opaque dispersed phase (silver powder in this case) causes the resistance to washout during injection molding to be poor.

By blending the energy curable resins with solvent based resins, the surprising result is that enough cure can be achieved in the film to provide resistance to washout of the print during injection molding, and still have the flexibility allowing elongation during the thermoforming process without cracking of the printed circuit.

Example 2 is a hybrid formulation in which 75% of the binder system is a free radical type energy curable resin, and 25% of the binder system consists of a vinyl-based solvent borne thermoplastic resin also containing a thermoplastic polyurethane resin with a very low glass transition temperature. This formulation shows some improvement in washout resistance, and may be suitable for a lower melt temperature molding plastic. It is compatible with the graphic first-down layer and dielectric overprint coating. At 25% elongation the printed 600 squares circuit has a resistance of 800 ohms, and at 15% elongation, the circuit has a lower resistance of 61 ohms.

Example 3 is a hybrid formulation in which 25% of the binder system is a free radical type energy curable resin, and 75% of the binder consists of a vinyl-based solvent borne thermoplastic resin also containing a thermoplastic polyurethane resin with a very low glass transition temperature. This formulation has a lower printed sheet resistance and still very good thermoformability, with a measured sheet resistance of 100 ohms at 25% elongation.

In fact, as demonstrated in example 4, even the inclusion of 1% of a free radical energy curable resin can provide a very good high elongation printed circuit that can achieve 22% elongation with excellent washout resistance. Printing a dielectric coating over the electronic ink does not interfere significantly with the conductivity of the circuit, and can improve the elongation to 27%, as demonstrated in example 5.

Example 6 is an energy curable ink based on a cationic curing mechanism rather than a free radical type photoinitiated formulation. Because a cationic ink can undergo post curing which is accelerated by heating, the resistance to washout is much better than that of free radical only based energy curable formulations, such as that of Example 1. In fact, the resistivity decreases over time even at ambient temperature as post curing takes place. In this way, a cationic formulation can achieve better through-cure of a thick screen printed ink layer. The thermoforming, however, is not as good, because the cured binder based on the cationic monomer alone is not flexible. However, as can be seen in Example 7, by formulating the cationic ink with a flexibilizing oligomer and including a UV curable dielectric coating, the ink can be thermoformed to a 10% elongation. By blending the cationic curing monomers with flexibilizing oligomers, or with solvent based systems, the thermoformability can be further enhanced.

As shown in Table 2, as the proportion of energy curable resin is increased, the washout resistance worsens, and the sheet resistance becomes higher. A straight energy curable free radical type binder has poor washout resistance and poor conductivity. Even low levels of added energy curable resin to a solvent based resin improves thermoformability and still has good washout resistance and low sheet resistance. The use of a cationic energy curable formulation can achieve better through-cure, and if formulated with flexible monomers, some thermoformability can be achieved as well. The formulation is useful in cases where a very deep draw is not required in a printed stack for a molded device.

Examples 8 to 13. Solvent Based Conductive Inks

Solvent based conductive inks were prepared according to the formulations in Table 3. Examples 8 to 10 are thermoformable conductive inks made according to the present invention, and examples 11 to 13 are comparative conductive inks.

TABLE 3

Formulations of solvent based inks Examples 8 to 13

| Raw materials | Solvent based vinyl-polyurethane Ex. 8 | Solvent based vinyl-polyester Ex. 9 | Solvent based polyester Ex. 10 | Solvent based polyester Ex. 11 | Solvent based eopxy Ex. 12 | Solvent based phenoxy Ex. 13 |
|---|---|---|---|---|---|---|
| Polyurethane resin (2) | 3.25 | | | | | |
| Expoxidised soybean oil (5) | 0.40 | 0.42 | | | | |
| Vinyl terpolymer resin (6) | 9.60 | 9.80 | | | | |
| Polyester resin (7) | | 3.25 | 15.00 | | | |
| Polyester varnish (8) | | | | 30.90 | | |
| Epoxy resin (9) | | | | | 31.40 | |
| Phenoxy resin (10) | | | | | | 8.00 |
| □-butyrolactone | 33.20 | 25.60 | 6.200 | 3.00 | 3.00 | 20.00 |
| Cyclohexanone | 7.50 | 6.40 | 7.30 | 1.90 | | 4.00 |
| Dibasic esters | | 3.53 | 16.50 | | | |
| Antifoam (17) | 0.05 | | | | | |
| Dispersant (18) | 1.00 | | | 1.10 | 0.52 | 1.00 |
| Dispersant (19) | | 1.00 | 1.00 | | | |
| Organic titanate (21) | | | | | 1.98 | |
| Silver flake (22) | | | | 63.1 | 63.10 | 67.0 |
| Silver flake (23) | | 50.00 | 54.00 | | | |
| Silver flake (24) | 45.00 | | | | | |
| Total | 100.00 | 100.00 | 100.00 | 100.00 | 100.00 | 100.00 |

The inks of Examples 11 to 13 were printed and cured, and tested as described above. The results are shown in Table 4.

Examples 11 through 13 are counterexamples demonstrating solvent borne thermally curable inks based on thermoplastic resins which show poor thermoformability. These

TABLE 4

Resistivity and thermoformability for Examples 8 to 13

| Curing conditions | Examples | Resistivity of printed 600 square resistors, mΩ/□/mil | Printed film thickness, μm | Sheet resistance of 600 squares resistor before elongation, Ω | Sheet resistance of 600 squares resistor at elongation, Ω | % elongation | Thermo-formability (% elongation) | Washout resistance |
|---|---|---|---|---|---|---|---|---|
| Over DMU graphic cyan ink, 120° C./5 mm (dielectric coating) | Example 8 SB cond | 56 | 10 | 86 | 200 | 22% | good | excellent |
| 120° C./15 min (dielectric coating) | Example 9 | 20 | 6.2 | 50 | 110 | 18% | good | excellent |
| 120° C./15 min (dielectric coating) | Example 10 | 650 | 8.3 | 1220 | 269 | 40% | excellent | excellent |
| 150° C./1 min | Example 11 | Cracking in most areas | | | | | | poor |
| 150° C./1 min | Example 12 | Cracking in some areas | | | | | | poor |
| 150° C./1 min | Example 13 | Poor printability, cracking | | | | | | poor |

Table 4 summarizes the results of the solvent based systems. The polyester used in Example 10 is particularly surprising since the resistance decreases with thermoforming. This occurs when the heat from thermoforming drives off residual solvents and improves the curing of the printed film, while simultaneously maintaining the integrity of the film.

Example 8 describes a vinyl resin based solvent borne conductive ink which contains a very low glass transition polyurethane, which can be printed on energy curable thermoformable inks and coated with thermoformable dielectric inks and coatings. Decorative inks printable by processes such as screen printing, pad printing, flexography, lithography, ink jet, xerography, or gravure printing may be used. Example 8 is fully curable by heating the printed conductive ink for 5 minutes at 120° C., and has a resistivity of 56 milliohms per square per mil. This ink has good thermoformability, and achieves a 22% elongation and a corresponding resistance of 200 ohms for a 600 squares printed resistor with an initial film thickness often microns before thermoforming.

Example 9 describes an ink based on solvent borne resins which include a vinyl-based resin, a low glass transition polyurethane, and a polyester. The thermoformability of this ink when cured by heating for five minutes at 120° C. and coated with a thermoformable dielectric is good, and can achieve an 18% elongation with a measured resistance of 110 ohms for a printed 600 squares resistor.

Example 10 is a polyester based ink that can achieve excellent thermoformability of 40% with a measured resistance of 269 ohms for the 600 squares printed resistors. The polyester in Example 10 has a high proportion of linear structure (i.e. is not highly branched).

inks have significant cracking in the printed resistors when subjected to the thermoforming process.

The present invention has been described in detail, including the preferred embodiments thereof. However, it will be appreciated that those skilled in the art, upon consideration of the present disclosure, may make modifications and/or improvements on this invention that fall within the scope and spirit of the invention.

What is claimed:
1. An ink or coating composition comprising:
   a) a polymer resin selected from the group consisting of: a vinyl resin; a blend of a vinyl resin with a polyurethane resin; a blend of a vinyl resin, polyurethane resin and energy curable resin composition comprising an acrylated polymer or oligomer having an aromatic or aliphatic polycarbonate backbone; a blend of a vinyl resin with a polyester resin; a polyester resin; a co-polyester resin; an energy curable resin composition comprising an acrylated polymer or oligomer having an aromatic or aliphatic polycarbonate backbone; a blend of a polyester resin with an energy curable resin composition comprising an acrylated polymer or oligomer having an aromatic or aliphatic polycarbonate backbone; a blend of a vinyl resin, a polyester resin, and energy curable resin composition comprising an acrylated polymer or oligomer having an aromatic or aliphatic polycarbonate backbone; a cationic resin which contains aliphatic monomers; and a blend of a cationic resin with a solvent-based resin; wherein the polymer resin is present in an amount of 1 wt % to 20 wt % based on the total weight of the ink or coating composition; and
   b) a conductive metal powder, wherein the conductive metal powder is present in an amount of 25 wt % to 75 wt % based on the total weight of the ink or coating composition; wherein the ink or coating is a thermoformable conductive ink or coating; and wherein the ink or coating provides a sheet resistance of 28 to 1320 ohms/600 squares printed resistor when applied to a substrate, before the substrate is thermoformed.

2. The ink or coating composition of claim 1, wherein the polymer resin is present in an amount of 2 wt % to 10 wt % based on the total weight of the ink or coating composition.

3. The ink or coating composition of claim 1, wherein the conductive metal powder is present in an amount of 30 wt % to 70 wt % based on the total weight of the ink or coating composition.

4. The ink or coating composition of claim 1, wherein the conductive metal powder is selected from silver, copper, gold, silver coated copper, bimetallic powders, graphite, carbon nanotubes, graphene, other carbon allotropes, other metals or metal oxides, and blends thereof.

5. The ink or coating composition of claim 1, wherein the conductive powder is spherical particles, flakes, rods, wires, nanoparticles, or combinations thereof.

6. The ink or coating composition of claim 1, wherein the vinyl resin is a homopolymer, copolymer, or terpolymer; the polyurethane resin is a homopolymer, copolymer, or blends of polyurethane resins; and the polyester resin is a homopolymer or copolymer.

7. The ink or coating composition of claim 1, wherein the vinyl resin is a hydroxyl, carboxyl, or epoxy functionalized resin.

8. The ink or coating composition of claim 1, wherein the vinyl resin further comprises a plasticizer.

9. The ink or coating composition of claim 1, wherein the vinyl resin has a glass transition temperature of 30° C. to 120° C.

10. The ink or coating composition of claim 1, wherein the polyurethane resin has a glass transition temperature of −60° C. to 75° C.

11. The ink or coating composition of claim 1, wherein the polyester resin has a glass transition temperature of 30° C. to 80° C.

12. The ink or coating composition of claim 1, wherein the polyester resin has an average molecular weight of from 10,000 to 100,000; a hydroxyl value of 2 to 10 mg KOH per gram of sample; and a glass transition temperature of 40° C. to 80° C.

13. The ink or coating composition of claim 1, further comprising an energy curable monomer or oligomer; wherein the energy curable monomer or oligomer is present in an amount of 1 wt % to 80 wt % based on the total weight of the polymer resin.

14. The ink or coating composition of claim 13, wherein the energy curable monomer or oligomer is an acrylated polyurethane containing a polycarbonate backbone.

15. The ink or coating composition of claim 1, wherein the polymer resin is a blend of a vinyl resin and a polyurethane resin.

16. The ink or coating composition of claim 1, wherein the vinyl resin is present in an amount of 0.5 wt % to 15 wt %, and the polyurethane resin is present in an amount of 2 wt % to 15 wt % based on the total weight of the ink or coating composition.

17. The ink or coating composition of claim 1, wherein the polymer resin is a polyester resin; or wherein the polymer resin is a blend of a vinyl resin and a polyester resin.

18. The ink or coating composition of claim 1, wherein the vinyl resin is present in an amount of 1 wt % to 40 wt %, and the polyester resin is present in an amount of 0.5 wt % to 30 wt %, based on the total weight of the ink or coating composition.

19. The ink or coating composition of claim 1, wherein the polyester resin is an amorphous linear polyester.

20. The ink or coating composition of claim 1, further comprising one or more solvents, dispersants, surfactants, other rheology modifying agents, photoinitiators, amine synergists, stabilizers, defoamers, de-aerators, waxes, colorants, or optical brighteners.

21. The ink or coating composition of claim 20, wherein the dispersant is present in an amount of 0.1 wt % to 6 wt %, based on the total weight of the ink or coating composition.

22. The ink or coating composition of claim 1, which is a solvent based, water based, energy curable, a hybrid solvent based/energy curable, or a hybrid water/energy curable conductive ink.

23. The ink or coating composition of claim 1, which is suitable for printing by flexography, lithography, xerography, gravure, screen printing, inkjet printing, pad printing, or stamping methods.

24. A thermoformable printed electronic device comprising a stacked print array, wherein one of the printed layers of the stacked print array is a thermoformable conductive ink or coating composition of claim 1.

25. The electronic device of claim 24, wherein the printed layer of thermoformable conductive ink or coating composition is compatible with underlying printed graphic layers, and subsequently printed functional layers.

26. The electronic device of claim 25, wherein the subsequently printed functional layer is an insulating layer or a dielectric layer.

27. A set of compatible inks or coatings for use in a printed stacked array comprising one or more of a graphic ink or coating, a conductive ink or coating composition of claim 1, and a dielectric coating.

28. The set of compatible inks or coatings of claim 27, wherein:
a) the graphic ink or coating comprises an energy curable acrylated polyurethane with a polycarbonate backbone;
b) the conductive ink or coating composition comprises a polyester resin, or a vinyl resin mixed with a thermally curable polyurethane resin; and an energy curable acrylated polyurethane with a polycarbonate backbone; and
c) the dielectric layer comprises an energy curable acrylated polyurethane with a polycarbonate backbone.

29. The set of compatible inks or coatings of claim 27, which can be used to fabricate a functional electronic device, a thermoformed part, or a thermoformed functional electronic device.

30. A printed electronic device formed using the sets of compatible inks or coatings of claim 27.

31. The set of compatible inks or coatings of claim 27, which is suitable for thermoforming processes that include an injection molding step.

32. The set of compatible inks or coatings of claim 27, which is suitable for processes that include an injection molding step.

33. A printed electronic device formed by printing multiple functional layers, using the conductive ink or coating composition of claim 1, and one or more of a graphic print ink or coating, and a dielectric ink or coating, wherein one layer is a solvent based thermally curable ink or coating, and another layer is an energy curable ink or coating; or one or more of a graphic ink or coating, and a dielectric ink or coating, wherein two or more layers are energy curable inks or coatings.

34. A thermoformable printed electronic device comprising a printable layer of graphic ink, and a layer of the conductive ink or coating composition of claim 1; or comprising a printable layer of a graphic ink, a conductive ink or coating composition of claim 1, and a dielectric coating.

35. The ink or coating composition of claim 1, which is suitable for thermoforming processes that include an injection molding step.

36. The ink or coating composition of claim 1, which is suitable for processes that include an injection molding step.

37. The ink or coating composition of claim 1, wherein the polyurethane resin has a glass transition temperature of −40° C. to −20° C.

38. The ink or coating composition of claim 1, wherein the polyester resin has an average molecular weight of 15,000 to 36,000; a hydroxyl value of 3 to 7 mg KOH per gram of sample; and a glass transition temperature of 42° C. to 75° C.

39. The ink or coating composition of claim 1, wherein the vinyl resin is present in an amount of 2 wt % to 4.5 wt %, and the polyurethane resin is present in an amount of 7.5 wt % to 11.5 wt % based on the total weight of the ink or coating composition.

40. The ink or coating composition of claim 1, wherein the vinyl resin is present in an amount of 8 wt % to 12 wt %, and the polyurethane resin is present in an amount of 1 wt % to 5 wt % based on the total weight of the ink or coating composition.

* * * * *